United States Patent
Grange et al.

(10) Patent No.: US 8,665,952 B1
(45) Date of Patent: Mar. 4, 2014

(54) APPARATUS AND METHOD FOR DECODING VIDEO ENCODED USING A TEMPORAL FILTER

(75) Inventors: Adrian Grange, Cambridgeshire (GB); Paul Wilkins, Cambridge (GB); Francis William Galligan, Clifton Park, NY (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/305,033

(22) Filed: Nov. 28, 2011

Related U.S. Application Data (63) Continuation of application No. 12/882,299, filed on Sep. 15, 2010, now Pat. No. 8,503,528.

(51) Int. Cl.
*H04B 1/66* (2006.01)

(52) U.S. Cl.
USPC ............ 375/240.13; 375/240.25; 375/240.12; 375/240.29; 375/240.26; 382/233; 382/235; 382/238; 382/236; 382/260; 382/261

(58) Field of Classification Search
USPC ............ 375/240.13, 240.25, 240.12, 240.29, 375/240.26; 382/233, 235, 238, 236, 260, 382/261
See application file for complete search history.

(56) References Cited

U.S. PATENT DOCUMENTS

| | | | |
|---|---|---|---|
| 5,568,200 A | 10/1996 | Pearlstein et al. | |
| 5,576,767 A | 11/1996 | Lee et al. | |
| 5,748,242 A | * 5/1998 | Podilchuk | .................. 348/391.1 |
| 5,959,672 A | 9/1999 | Sasaki | |
| 5,999,641 A | 12/1999 | Miller et al. | |
| 6,097,842 A | 8/2000 | Suzuki et al. | |
| 6,108,383 A | 8/2000 | Miller et al. | |
| 6,181,822 B1 | 1/2001 | Miller et al. | |

(Continued)

FOREIGN PATENT DOCUMENTS

| | | |
|---|---|---|
| KR | 1020080064355 A | 9/2008 |
| WO | 03084235 A1 | 10/2003 |
| WO | 2006078115 A1 | 7/2006 |
| WO | 2008008331 A2 | 1/2008 |

OTHER PUBLICATIONS

"Series H: Audiovisual and Multimedia Systems; Infrastructure of audiovisual services- Coding of moving video; Advanced video coding for generic audiovisual services". H.264. Version 1. International Telecommunication Union. Dated May 2003.

(Continued)

*Primary Examiner* — Shawn An
(74) *Attorney, Agent, or Firm* — Young Basile Hanlon & MacFarlane P.C.

(57) ABSTRACT

Embodiments of an apparatus and method for decoding an encoded bitstream to generate a video signal are taught. A decoder receives the bitstream and decodes a portion thereof to obtain at least a portion of a predictive reference frame. The reference frame is generated by, for example, selecting a filter set including a target frame with a block having a plurality of pixels and at least one adjacent frame, determining a coding mode associated with the block, determining a block-specific factor derived from the coding mode, determining weighted averages of pixels in the filter set and using the weighted averages to generate the predictive reference frame. The decoder also generates a residual from another portion of the encoded bitstream that represents a portion of a frame of the plurality of frames and reconstructs the portion of the frame by adding the residual to the predictive reference frame.

12 Claims, 7 Drawing Sheets

(56) References Cited

U.S. PATENT DOCUMENTS

| | | | |
|---|---|---|---|
| 6,292,837 | B1 | 9/2001 | Miller et al. |
| 6,327,304 | B1 | 12/2001 | Miller et al. |
| 6,370,267 | B1 | 4/2002 | Miller et al. |
| 6,560,366 | B1 | 5/2003 | Wilkins |
| 6,774,929 | B1 | 8/2004 | Kopp |
| 6,904,096 | B2 | 6/2005 | Kobayashi et al. |
| 7,027,654 | B1 | 4/2006 | Ameres et al. |
| 7,221,710 | B2 | 5/2007 | Lee |
| 7,499,492 | B1 | 3/2009 | Ameres et al. |
| 7,590,179 | B2 | 9/2009 | Mukerjee |
| 7,606,310 | B1 | 10/2009 | Ameres et al. |
| 7,627,040 | B2 | 12/2009 | Woods et al. |
| 7,734,821 | B2 | 6/2010 | Wang et al. |
| 7,773,677 | B2 | 8/2010 | Lee |
| 8,045,813 | B2 * | 10/2011 | Lee et al. ............... 382/238 |
| 8,111,752 | B2 | 2/2012 | Kumar et al. |
| 8,121,196 | B2 * | 2/2012 | Katsavounidis et al. 375/240.25 |
| 2002/0071485 | A1 | 6/2002 | Caglar et al. |
| 2002/0176502 | A1 | 11/2002 | Rose et al. |
| 2003/0039310 | A1 | 2/2003 | Wu et al. |
| 2003/0165331 | A1 | 9/2003 | Van Der Schaar |
| 2003/0202594 | A1 | 10/2003 | Lainema |
| 2003/0215014 | A1 | 11/2003 | Koto et al. |
| 2004/0042549 | A1 | 3/2004 | Huang et al. |
| 2004/0080669 | A1 | 4/2004 | Nagai et al. |
| 2004/0184533 | A1 | 9/2004 | Wang |
| 2004/0202252 | A1 | 10/2004 | Lee |
| 2004/0228410 | A1 | 11/2004 | Ameres et al. |
| 2005/0286629 | A1 | 12/2005 | Dumitras et al. |
| 2006/0062481 | A1 | 3/2006 | Suvanto |
| 2006/0093038 | A1 | 5/2006 | Boyce |
| 2006/0098738 | A1 | 5/2006 | Cosman et al. |
| 2006/0285598 | A1 | 12/2006 | Tulkki |
| 2007/0009034 | A1 | 1/2007 | Tulkki |
| 2007/0081593 | A1 | 4/2007 | Jeong et al. |
| 2007/0092010 | A1 | 4/2007 | Huang et al. |
| 2007/0098067 | A1 | 5/2007 | Kim et al. |
| 2007/0109409 | A1 | 5/2007 | Yea et al. |
| 2007/0153899 | A1 | 7/2007 | Koto et al. |
| 2007/0199011 | A1 | 8/2007 | Zhang |
| 2007/0230572 | A1 * | 10/2007 | Koto et al. ............... 375/240.12 |
| 2007/0274388 | A1 | 11/2007 | Lee et al. |
| 2008/0101469 | A1 * | 5/2008 | Ishtiaq et al. ............ 375/240.16 |
| 2008/0112486 | A1 | 5/2008 | Takahashi et al. |
| 2008/0130755 | A1 | 6/2008 | Loukas et al. |
| 2008/0198931 | A1 | 8/2008 | Chappalli et al. |
| 2008/0219351 | A1 | 9/2008 | Kim et al. |
| 2008/0279279 | A1 | 11/2008 | Liu et al. |
| 2009/0034617 | A1 | 2/2009 | Tanaka |
| 2010/0061461 | A1 | 3/2010 | Bankoski |
| 2010/0239015 | A1 | 9/2010 | Wang et al. |
| 2011/0007799 | A1 | 1/2011 | Karczewicz et al. |
| 2011/0228843 | A1 * | 9/2011 | Narroschke et al. ..... 375/240.03 |
| 2012/0063513 | A1 | 3/2012 | Grange et al. |

OTHER PUBLICATIONS

"Series H: Audiovisual and Multimedia Systems; Infrastructure of audiovisual services- Coding of moving video; Advanced video coding for generic audiovisual services". H.264. Version 3. International Telecommunication Union. Dated Mar. 2005.
"Overview; VP7 Data Format and Decoder". Version 1.5. On2 Technologies, Inc. Dated Mar. 28, 2005.
"Series H: Audiovisual and Multimedia Systems; Infrastructure of audiovisual services- Coding of moving video; Advanced video coding for generic audiovisual services". H.264. Amendment 1: Support of additional colour spaces and removal of the High 4:4:4 Profile. International Telecommunication Union. Dated Jun. 2006.
"VP6 Bitstream & Decoder Specification". Version 1.02. On2 Technologies, Inc. Dated Aug. 17, 2006.
"Series H: Audiovisual and Multimedia Systems; Infrastructure of audiovisual services- Coding of moving video". H.264. Amendment 2: New profiles for professional applications. International Telecommunication Union. Dated Apr. 2007.
"VP6 Bitstream & Decoder Specification". Version 1.03. On2 Technologies, Inc. Dated Oct. 29, 2007.
"Series H: Audiovisual and Multimedia Systems; Infrastructure of audiovisual services- Coding of moving video". H.264. Advanced video coding for generic audiovisual services. Version 8. International Telecommunication Union. Dated Nov. 1, 2007.
"Series H: Audiovisual and Multimedia Systems; Infrastructure of audiovisual services- Coding of moving video". H.264. Advanced video coding for generic audiovisual services. International Telecommunication Union. Version 11. Dated Mar. 2009.
"Series H: Audiovisual and Multimedia Systems; Infrastructure of audiovisual services- Coding of moving video". H.264. Advanced video coding for generic audiovisual services. International Telecommunication Union. Version 12. Dated Mar. 2010.
"Implementors' Guide; Series H: Audiovisual and Multimedia Systems; Coding of moving video: Implementors Guide for H.264: Advanced video coding for generic audiovisual services". H.264. International Telecommunication Union. Version 12. Dated Jul. 30, 2010.
"VP8 Data Format and Decoding Guide". WebM Project. Google On2. Dated: Dec. 1, 2010.
Bankoski et al. "VP8 Data Format and Decoding Guide; draft-bankoski-vp8-bitstream-02" Network Working Group. Dated May 18, 2011.
Bankoski et al. "Technical Overview of VP8, An Open Source Video Codec for the Web". Dated Jul. 11, 2011.
Bankoski et al. "VP8 Data Format and Decoding Guide" Independent Submission. Dated Nov. 2011.
Zhi Liu, Zhaoyang Zhang, Liquan Shen, Mosaic Generation in H.264 Compressed Domain, IEEE2006.
ON2 Technologies, Inc. White Paper TrueMotion VP7 Video Codec, Jan. 10, 2005, 13 pages, Document Version: 1.0, Clifton Park, New York.
ON2 Technologies, Inc. White Paper On2's TrueMotion VP7 Video Codec, Jul. 11, 2008, 7 pages, Document Version: 1.0, Clifton Park, New York.
Bankoski, J.; Wilkins, P.; Xu, Y.; "VP8 Data Format and Decoding Guide", Network Working Group, Internet-Draft, May 18, 2011, 288 pp.
International Telecommunications Union, ITU-T, Telecommunication Standardization Section of ITU, "Series H: Audiovisual and Multimedia Systems, Infrastructure of audiovisual services—Coding of moving video", Mar. 2010, 676 pp.
Bankoski, J.; Wilkins, P.; Xu, Y.; "Technical Overivew of VP8, An Open Source Video Codec for the Web", Date Unknown, 6 pp.
Wu, Yaowu; "InsideWebM Technology: The VP8 Alternate Reference Frame"; http://blog.webmproject.org/2010/05/Inside-webm-techno1 ogy-vp8-a1ternate.html dated May 27, 2010.
International Search Report for PCT/US2011/051287; dated Nov. 10, 2011.
Written Opinion of the International Searching Authority dated Apr. 20, 2010 from the corresponding International Application No. PCT/US2009/056448 filed Sep. 10, 2009.
International Search Report dated Apr. 20, 2010 from the corresponding International Application No. PCT/US2009/056448.
U.S. Appl. No. 12/102,694, Video Compression and Encoding Method, filed Apr. 14, 2008.
U.S. Appl. No. 11/932,870, Video Compression and Encoding Method, filed Oct. 31, 2007.
Liu, P., et al., "A fast and novel intra and inter modes decision prediction algorithm for H.264/AVC based-on the characteristics of macro-block", 2009 Fifth Intl. Confr. on Intelligent Information Hiding and Multimedia Signal Processing, pp. 286-289, http://ieeexplore.ieee.org/stamp.jsp?tp=&arnumber=5337483.
Irani, M., et al., "Video Compression Using Mosaic Representations", Signal Processing Image Communication, vol. 7, No. 4., pp. 529-552, Nov. 1, 1995.
Feng, Wu et al., "Efficient Background Video Coding With Static Sprite Generation and Arbitrary-Shape Spatial Prediction Techniques", IEEE Transactions on Circuits and Systems for Video Technology, vol. 13, No. 5, pp. 394-405, May 1, 2003.

(56) References Cited

OTHER PUBLICATIONS

Hiroshi, Watanabe et al., "Sprite Coding in Object-Based Video Coding Standard: MPEG-4", Proceedings of Multiconference on Systemics, Cybernetics and Informatics, vol. 13, pp. 420-425, Jul. 1, 2001.
Girod, B., et al., "3-D Image Models and Compression: Synthetic Hybrid or Natural Fit?", International Conference on Image Processing, vol. 2, pp. 525-529, Oct. 24, 1999.
Borman, S., et al., "Super-Resolution From Image Sequences—A Review", Proceedings of Midwest Symposium on Circuits and Systems, pp. 374-378, Aug. 9, 1998.
European Supplementary Search Report, EP09813575, Dated Oct. 23, 2012.

* cited by examiner

APPARATUS AND METHOD FOR DECODING VIDEO ENCODED USING A TEMPORAL FILTER

CROSS-REFERENCE TO RELATED APPLICATION

This application is a continuation of U.S. patent application Ser. No. 12/882,299, filed Sep. 15, 2010, which is hereby incorporated in its entirety by reference.

TECHNICAL FIELD

The present invention relates in general to video encoding and decoding.

BACKGROUND

An increasing number of applications today make use of digital video for various purposes including, for example, remote business meetings via video conferencing, high definition video entertainment, video advertisements, and sharing of user-generated videos. As technology is evolving, users have higher expectations for video quality and expect high resolution video even when transmitted over communications channels having limited bandwidth.

SUMMARY

Embodiments of an apparatus and method for decoding a video signal are disclosed.

One aspect of a method for decoding an encoded bitstream to generate a video signal having a plurality of frames taught herein comprises receiving the encoded bitstream at a decoder, decoding a portion of the encoded bitstream to obtain at least a portion of a predictive reference frame using the decoder, generating a residual from another portion of the encoded bitstream, the residual representing a portion of a frame of the plurality of frames, and reconstructing the portion of the frame by adding the residual to the at least the portion of the predictive reference frame. The at least a portion of the predictive reference frame is generated by a process of selecting a filter set from the plurality of frames, the filter set including a target frame with a block having a plurality of pixels and at least one frame adjacent to the target frame, determining a prediction coding mode associated with the block, determining a block-specific factor for the block, the block-specific factor derived from the prediction coding mode, determining weighted averages of pixels in the filter set, wherein the pixels in the filter set include at least some of the plurality of pixels of the block and a weight applied to the at least some of the plurality of pixels of the block is derived from the block-specific factor, and using the weighted averages to generate the at least the portion of the predictive reference frame.

Another aspect of such a method comprises receiving the encoded bitstream at a decoder and decoding a portion of the encoded bitstream to obtain at least a portion of a predictive reference frame using the decoder, the at least a portion of the predictive reference frame generated by a process of determining a plurality of factors for a first block residing in a selected frame, wherein each of the plurality of factors is at least partially indicative of a correlation between the first block and at least a second block residing in a different one of the plurality of frames, and applying filter weights derived from the plurality of factors to at least the first block and the second block to generate the at least the portion of the predictive reference frame. This aspect also includes generating a residual from another portion of the encoded bitstream, the residual representing a portion of a frame of the plurality of frames and reconstructing the portion of the frame by adding the residual to the at least the portion of the predictive reference frame.

An aspect of an apparatus for decoding an encoded bitstream to generate a video signal having a plurality of frames comprises a decoder and a display for displaying the video signal. The decoder is programmed to receive the encoded bitstream and decode a portion of the encoded bitstream to obtain at least a portion of a predictive reference frame using the decoder, the at least a portion of the predictive reference frame generated by a process of determining a plurality of factors for a first block residing in a selected frame, wherein each of the plurality of factors is at least partially indicative of a correlation between the first block and at least a second block residing in a different one of the plurality of frames, and applying filter weights derived from the plurality of factors to at least the first block and the second block to generate the at least the portion of the predictive reference frame. The decoder is also programmed to generate a residual from another portion of the encoded bitstream, the residual representing a portion of a frame of the plurality of frames, and reconstruct the portion of the frame by adding the residual to the at least the portion of the predictive reference frame.

BRIEF DESCRIPTION OF THE DRAWINGS

The description herein makes reference to the accompanying drawings wherein like reference numerals refer to like parts throughout the several views, and wherein.

DETAILED DESCRIPTION

To permit higher quality transmission of video while limiting bandwidth consumption, a number of video compression schemes are noted including formats such as VPx, promulgated by Google Inc. of Mountain View, Calif., and H.264, a standard promulgated by ITU-T Video Coding Experts Group (VCEG) and the ISO/IEC Moving Picture Experts Group (MPEG), including present and future versions thereof. H.264 is also known as MPEG-4 Part 10 or MPEG-4 AVC (formally, ISO/IEC 14496-10).

These compression schemes may use prediction techniques to minimize the amount of data required to transmit video information. Prediction techniques can allow for multiple past transmitted frames and future frames to be transmitted out of order and used as potential reference frame predictors for macroblocks in a frame. For example, video compression schemes such as the MPEG or H.264 standard allow for transmission of frames out of order and use them to produce better predictors by use of forward or bidirectional prediction. Further, for example, the H.264 standard allows for multiple past reference frames to be used as a predictor. More recently, some predication techniques synthesize predictive reference frames that are not necessarily displayed during the decoding process, such as shown, for example, by U.S. Pat. Appl. Publication No. 2010/0061461 A1.

Figure 1:
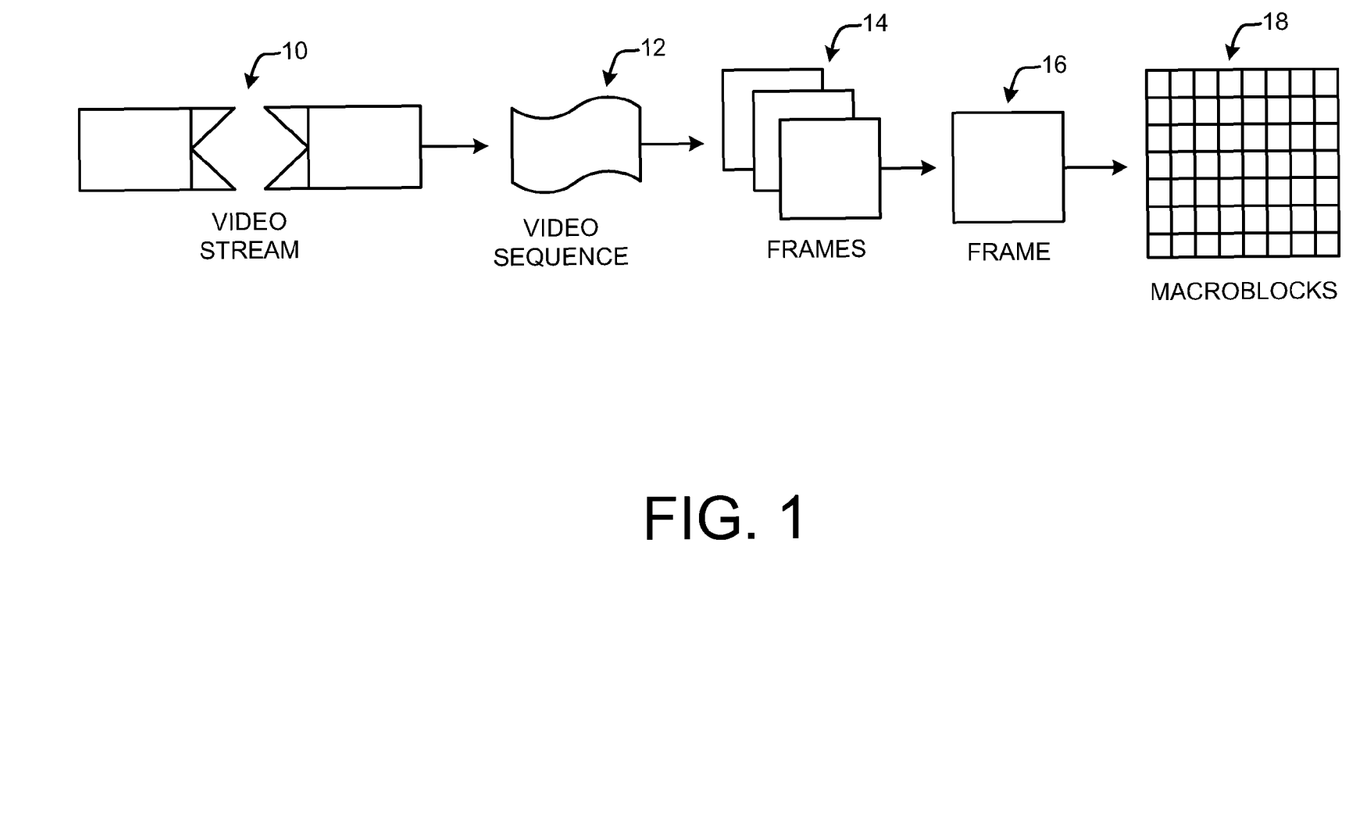
FIG. 1 is a diagram of a video bitstream.

FIG. 1 is a diagram a typical video bitstream 10 to be encoded and decoded. Video coding formats, such as VP8 or H.264, provide a defined hierarchy of layers for video stream 10. Video stream includes a video sequence 12. At the next level, video sequence 12 consists of a number of adjacent frames 14, which can be further subdivided into a single frame 16. At the next level, frame 16 can be composed of a series of macroblocks 18, which contain data corresponding to, for example, a 16×16 block of displayed pixels in frame 16. Each macroblock can contain luminance and chrominance data for the corresponding pixels. Macroblocks 18 can also be of any other suitable size such as 16×8 pixel groups or 8×16 pixel groups.

Figure 2:
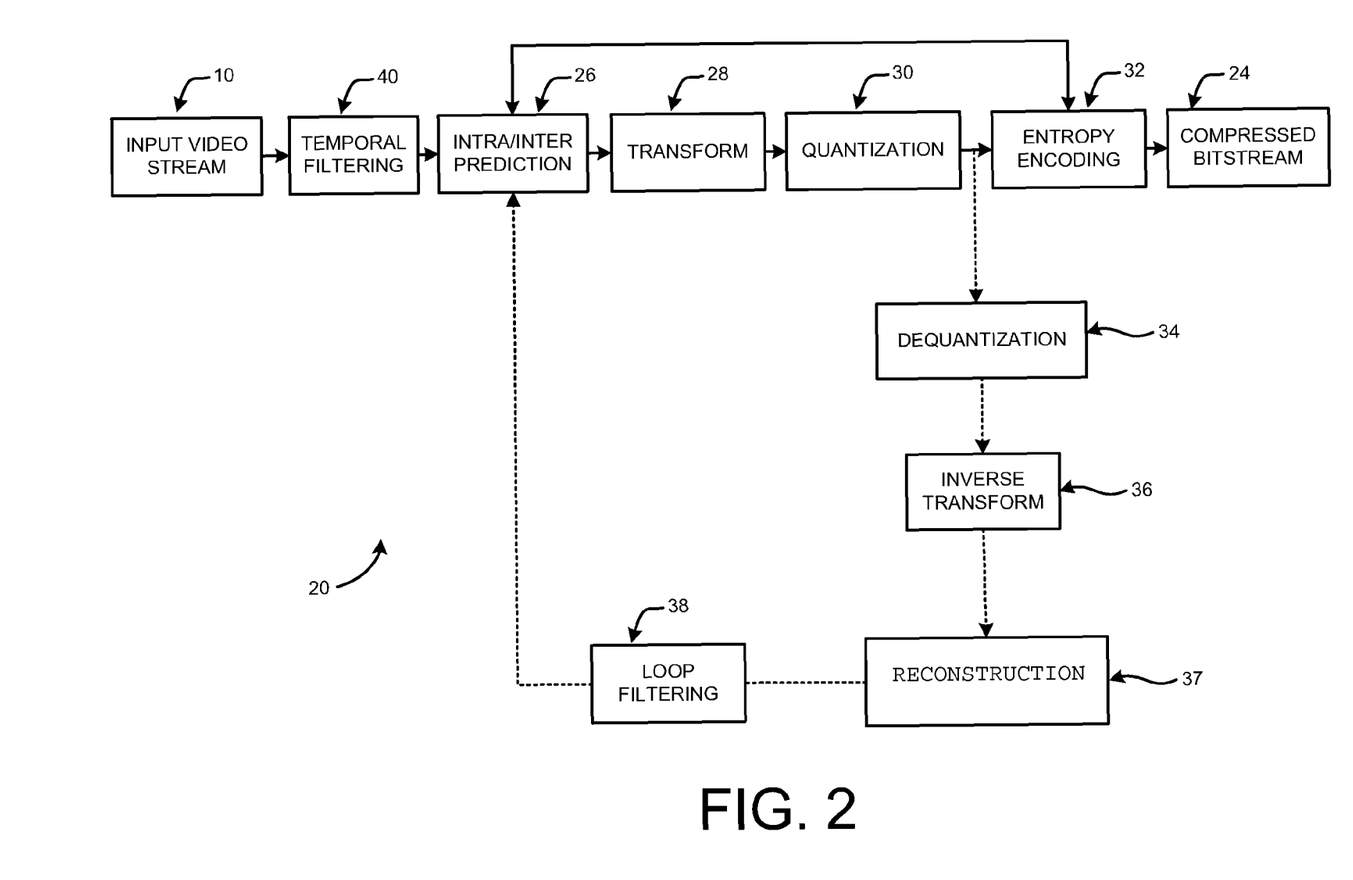
FIG. 2 is a block diagram of a video compression system in accordance with one embodiment.

FIG. 2 is a block diagram of a video compression system in accordance with one embodiment. An encoder 20 encodes as input video stream 10. Encoder 20 has stages to perform the various functions in a forward path (shown by the solid connection lines) to produce an encoded or compressed bitstream 24: temporal filter stage 40, intra/inter prediction stage 26, transform stage 28, quantization stage 30 and entropy encoding stage 32. Encoder 20 also includes a reconstruction path (shown by the dotted connection lines) to reconstruct a frame for encoding of further macroblocks. Encoder 20 has stages to perform the various functions in the reconstruction path: dequantization stage 34, inverse transform stage 36, reconstruction stage 37 and loop filtering stage 38. Other structural variations of encoder 20 can be used to encode bitstream 24.

Encoder 20 includes a temporal filter 40, which as shown in FIG. 2 can be included with the intra/inter prediction stage 26. In this case temporal filter 40 can be designed to filter noise from a set of frames so that the output of filter 40 can be used to synthesize a reference or alternative predictor frame. The implementation of temporal filter 40 is discussed below. The parameters of temporal filter 40 can be adjusted to create a reduced-noise frame for use as a predictor during the encoding process. For example, the filter length, weightings and strength can be adjusted. This adjustment process can permit the filtering to take into account contextual information (such as, for example, coding modes) and other input to establish the degree of correlation between adjacent frames to filter noise from a common underlying signal. The process can be applied at the full-frame, macro-block or any other segmentation of the frame where the degree of spatial correlation between frames can be established.

When input video stream 10 is presented for encoding, each frame 16 within input video stream 22 is processed in units of macroblocks. At intra/inter prediction stage 26, each macroblock can be encoded using either intra prediction or inter prediction mode. In either case, a prediction macroblock can be formed based on a reconstructed frame. In the case of intra-prediction, a prediction macroblock can be formed from samples in the current frame that have been previously encoded and reconstructed. In the case of inter-prediction, a prediction macroblock can be formed from one or more constructed reference frames as described in additional detail herein.

Next, still referring to FIG. 2, the prediction macroblock can be subtracted from the current macroblock at stage 26 to produce a residual macroblock (residual). Transform stage 28 transform codes the residual, and quantization stage 30 quantizes the residual to provide a set of quantized transform coefficients. The quantized transform coefficients are then entropy coded by entropy encoding stage 32. The entropy-coded coefficients, together with the information required to decode the macroblock, such as the type of prediction mode used, motion vectors and quantizer value, are output to compressed bitstream 24.

The reconstruction path in FIG. 2 is present to ensure that both the encoder and the decoder use the same reference frames required to decode the macroblocks. The reconstruction path, similar to functions that take place during the decoding process that are discussed in more detail below, includes dequantizing the transformed coefficients by dequantization stage 34 and inverse transforming the coefficients by inverse transform stage 36 to produce a derivative residual macroblock (derivative residual). At reconstruction stage 37, the prediction macroblock can be added to the derivative residual to create a reconstructed macroblock. A loop filter 38 can be applied to the reconstructed macroblock to reduce blocking distortion. The output of loop filter 38 is passed to intra/inter prediction stage 40 so that the reconstructed block can be used to determine the residual for the current block.

The encoding process shown in FIG. 2 can include two iterations or "passes" of processing the video data. The first pass can be carried out by encoder 20 using an encoding process that is less computationally intensive, and that gathers and stores information about input video stream 10 for use in the second pass. In the second pass, encoder 20 uses this information to optimize final encoding of compressed bitstream 24. For example, encoder 20 may use this information to select parameters for encoding, locating key-frames and selecting coding modes used to encode macroblocks 18, and allocating the number of bits to each frame. The output of the second pass can be final compressed bitstream 24.

Figure 3:
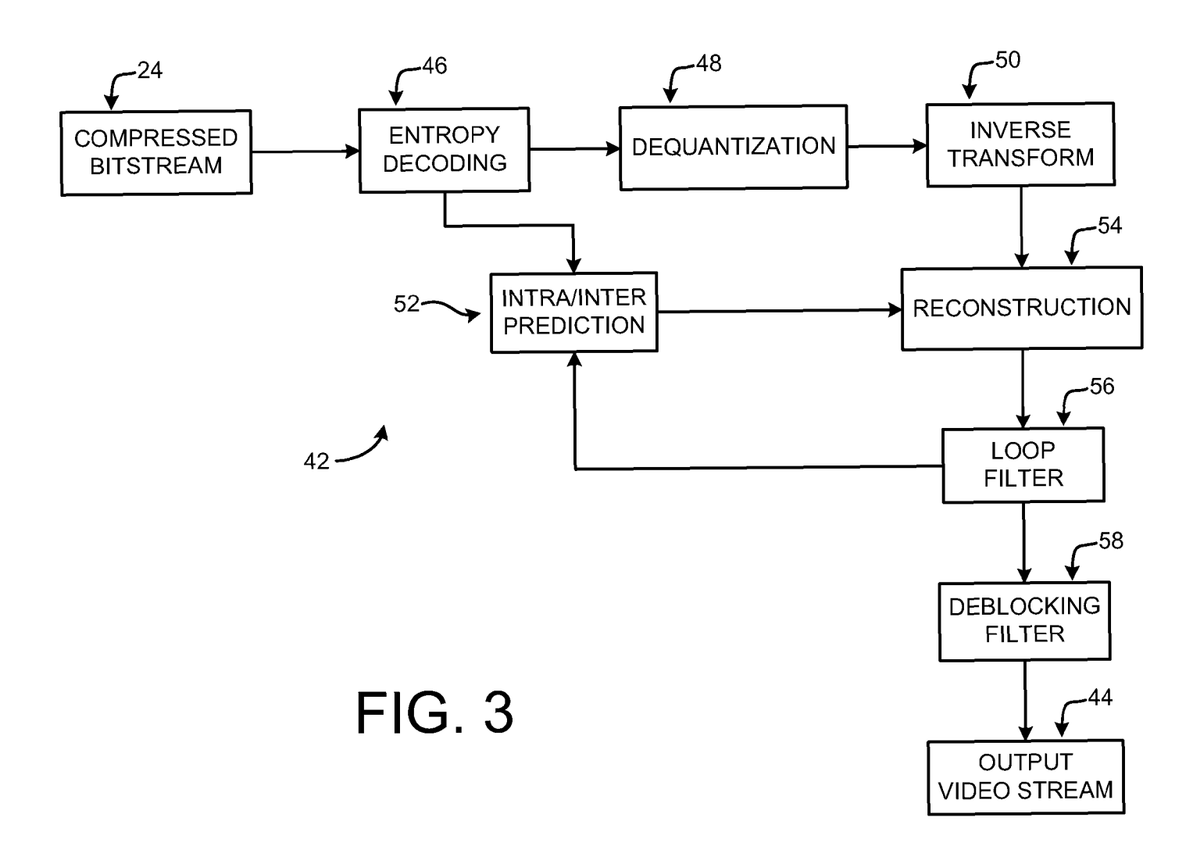
FIG. 3 is a block diagram of a video decompression system in accordance with another embodiment.

FIG. 3 is a block diagram of a video decompression system or decoder 42 to decode compressed bitstream 24. Decoder 42, similar to the reconstruction path of the encoder 20 discussed previously, has stages to perform various functions to produce an output video stream 44: entropy decoding stage 46, dequantization stage 48, inverse transform stage 50, intra/inter prediction stage 52, reconstruction stage 54, loop filter stage 56 and deblocking filtering stage 58. Other structural variations of decoder 42 can be used to decode compressed bitstream 24.

When compressed bitstream 24 is presented for decoding, the data elements can be entropy decoded by entropy decoding stage 46 (using for, for example, Context Adaptive Binary Arithmetic Coding) to produce a set of quantized coefficients. Dequantization stage 48 dequantizes the coefficients, and inverse transform stage 50 inverse transforms the coefficients to produce a derivative residual that can be identical to that created by the reconstruction stage in the encoder 20. Using header information decoded from the compressed bitstream 24, at intra/inter prediction stage 52, decoder 42 creates the same prediction macroblock as was created in encoder 20. At the reconstruction stage 54, the prediction macroblock can be added to the derivative residual to create a reconstructed macroblock. The loop filter 56 can be applied to the reconstructed macroblock to further reduce blocking artifacts. Deblocking filter 58 can be applied to the reconstructed macroblock to reduce blocking distortion, and the result is output as output video stream 44.

Referring again to encoder 20, video encoding methods compress video signals by using lossless or lossy compression algorithms to compress each frame or blocks of each frame of a series of frames. As can be implied from the description above, intra-frame coding refers to encoding a frame using data from that frame, while inter-frame coding refers to predictive encoding schemes such as schemes that comprise encoding a frame based on other so-called "reference" frames. For example, video signals often exhibit temporal redundancy in which frames near each other in the temporal sequence of frames have at least portions that match or at least partially match each other. Encoders can take advantage of this temporal redundancy to reduce the size of encoded data by encoding a frame in terms of the difference between the current frame and one or more reference frames.

Video encoders may use motion compensation based algorithms that match blocks of the frame being encoded to portions of one or more other frames. The block of the encoded frame may be shifted in the frame relative to the matching portion of the reference frame. This shift is characterized by a motion vector. Any differences between the block and partially matching portion of the reference frame may be characterized in terms of a residual. The encoder 20 may thus encode a frame as data that comprises one or more of the motion vectors and residuals for a particular partitioning of the frame. A particular partition of blocks for encoding the frame may be selected by approximately minimizing a cost function that, for example, balances encoding size with distortion to the content of the frame resulting from encoding.

A constructed/alternative reference frame is a frame of image data that is encoded into the bitstream and serves to improve the encoding of subsequently transmitted frames. Unlike a conventional reference frame, a constructed reference frame is not shown to the user. The constructed reference frame may not have the same dimensions as the video stream's raw image frames or the frames displayed to the user. Instead, the constructed reference frame serves as a predictor, giving subsequent frames a better predictive choice than a prior transmitted frame might offer. The creation of a constructed reference frame is not defined by the bitstream. Instead, creating the best possible constructed reference frame is a task left to the encoder. This provides a benefit in that the decoder need not re-perform the computations used to create the constructed reference frame. Computationally-expensive processes can be used on by the encoder to derive the constructed reference frame, but this process need not be performed by the decoder, thus permitting faster, lighter and more efficient decoding.

As described briefly above, many video coding algorithms first partition each picture into macroblocks. Then, each macroblock can be coded using some form of predictive coding method. Some video coding standards use different types of predicted macroblocks in their coding. In one scenario, a macroblock may be one of three types: 1) Intra (I) macroblock that uses no information from other pictures in its coding; 2) Unidirectionally Predicted (P) macroblock that uses information from one preceding picture; and 3) Bidirectionally Predicted (B) macroblock that uses information from one preceding picture and one future picture.

Figure 4:
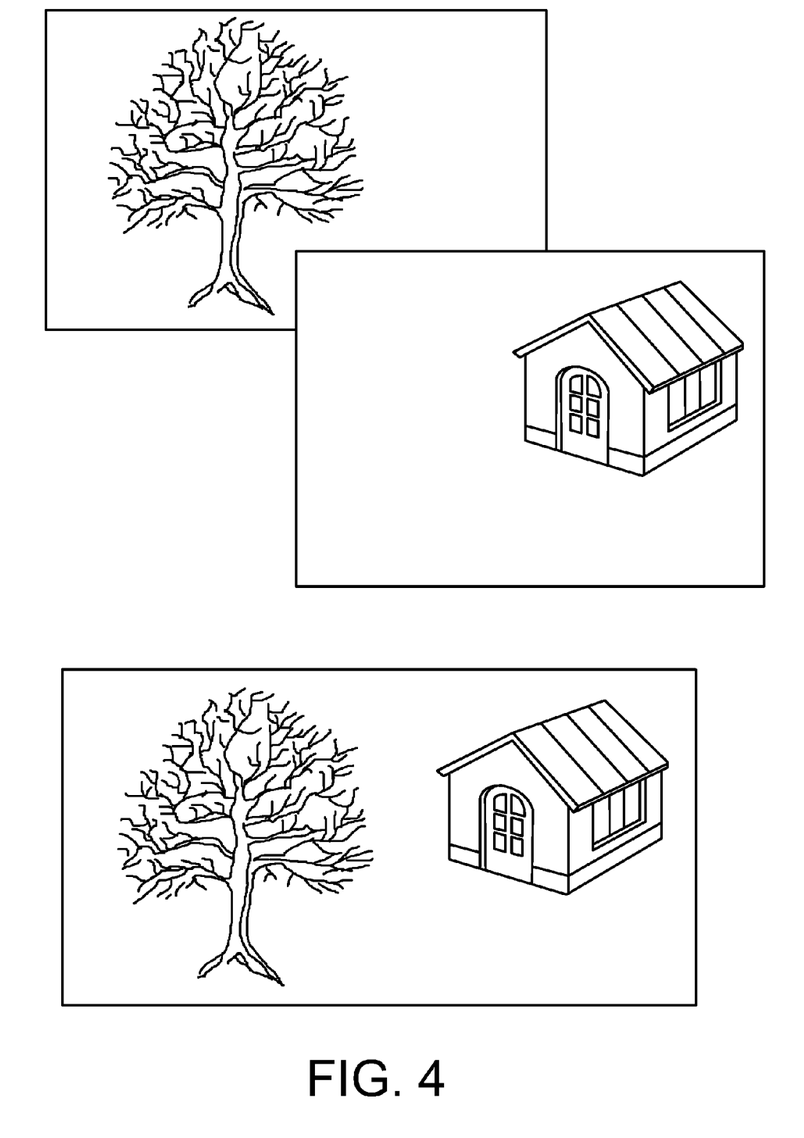
FIG. 4 is a pictorial representation of a constructed reference frame created using the video compression system shown in FIG. 2.

To facilitate higher quality compressed video, it is helpful to have the best matching reference frame in order to have the smallest difference to encode, which generally results in a more compact encoding. Reference frames are based on past frames, future frames, or an intra-frame so that the encoder can find the best matching block to use in the predictive process as shown in, for example, U.S. Application Publication No. 2005/0286629. Reference frames can also be based on synthesized or constructed frames that are not shown to the end user after decoding, as shown in, for example, in co-pending U.S. Pat. App. Publication No. 2010/0061461 A1 filed Dec. 5, 2008 and hereby incorporated by reference in its entirety. FIG. 4 is a pictorial representation of a constructed reference frame. Such constructed reference frames are referred to herein as "alternative reference frames."

The method of constructing a reference frame can include selecting the target frame and using temporal filter 40 (FIG. 2) to remove video noise from several source frames centered on that target frame. Noise filtering can be applied by the encoder by using, for example, a motion-compensated threshold blur filter such as described in U.S. Pat. No. 6,178,205, which is incorporated herein in its entirety by reference, or by using another appropriate filter such as an averaging process. Removal of the video noise that differs from frame to frame makes the constructed reference frame a better predictor for multiple frames, increasing data compression of the video stream.

In this case, temporal filter 40 is associated with at least two parameters, length L and strength S. These parameters are discussed below in more detail, but in general length L refers to the number of frames that are being filtered (the "filter set") and strength S refers to the strength of the filter—that is, its power to suppress noise. The value of strength S can be fixed for the entire filter set or can be adjusted locally based on the amount of noise in a video signal. As discussed below, temporal filter 40 can also adjust weightings W applied to individual macroblocks and pixels to improve filter performance when the underlying signal is non-stationary or includes discontinuities.

Figure 5:
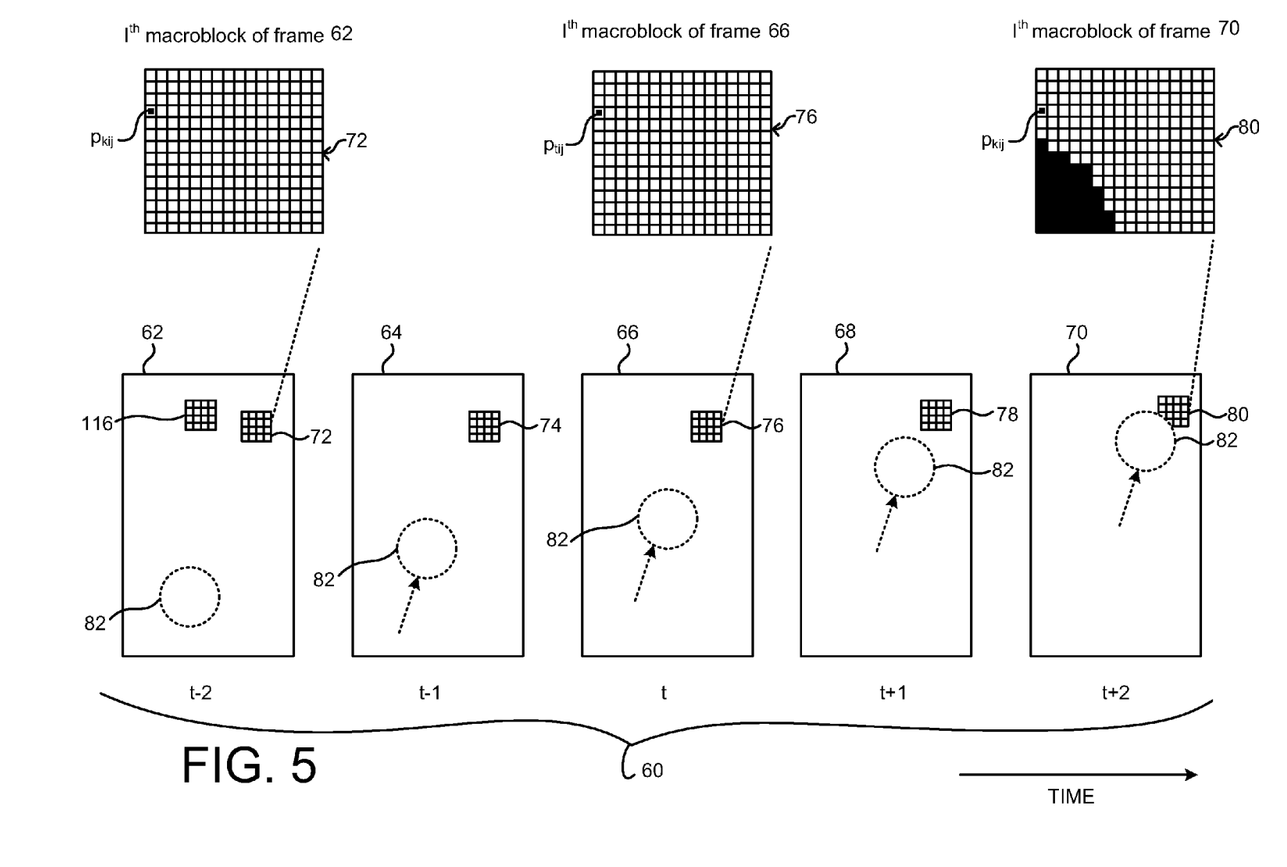
FIG. 5 is a schematic diagram illustrating a set of frames to be filtered using the temporal filter shown in FIG. 2.

The operation of temporal filter 40 is now explained in more detail. FIG. 5 is a schematic diagram illustrating a set of frames 60 to be filtered that are centrally temporally disposed around reference frame 66. Reference frame 66 occurs at time t and is followed by frames 68 and 70, occurring at times t+1 and t+2, respectively. Reference frame 66 is preceded in time by frames 62 and 64, occurring at times t−2 and t−1, respectively. In this case filter length L is 5. Other filter lengths may be used. Using temporal filter 40, encoder 20 can reduce random noise fluctuations in pixel values occurring over the filter set 60.

Each of frames 62-70 includes macroblocks such as macroblocks 72-80, which are located at the same corresponding spatial position in each frame. Macroblocks 72-80 are comprised of pixels including pixels located at the same corresponding spatial positions in each frame. Pixels are referred to herein as $p_{k,i,j}$, where k designates the frame (that is, one of frames 62-70 occurring at times t−2 through t+2), i designates the macroblock within each frame, and j designates the pixel position within each macroblock. For example, and referring to FIG. 5, pixels $p_{k,i,j}$ in corresponding positions are shown in macroblocks 72, 76 and 80. Note that in macroblock 76, the subscript k is replaced with the value t for purposes of illustration because macroblock 76 resides in reference frame 66 which occurs at time t. The subscript for the pixel in macroblock 72 could also have been expressed as $p_{(t-2),i,j}$, for example. The spatial correspondence referred herein means the pixel, macroblock or other partition has the same or corresponding position from one frame to another. Also, as explained below, motion vectors can be taken into account when determining what constitutes spatial correspondence.

Temporal filtering for noise reduction can in some cases operate on the principle that the zero-mean noise can be removed from the static signal observed over a set of consecutive frames by some form of averaging process. Other types of noise can also be removed. Such schemes provide effective filtering performance when the captured scene or portion thereof is stationary. However, filter sets can include non-stationary content. For example, the scene may include motion or a change in content (at a scene change for example). In these non-stationary filter sets, then the premise of a stationary signal is broken and the filter output can be distorted. For example, as an object 82 (FIG. 5) moves quickly through the scenes of frames 62-70, the pixel values in macroblock 80 are different (indicated by black boxes) relative to the spatially corresponding pixels of macroblocks 72 and 76, for example. The variance in the underlying signal caused by this motion adversely affects conventional filtering schemes, which may attenuate the underlying signal attributable to the movement or may produce distortions in their output based on the signal attributable to the movement.

One application for filtering as described herein is in the creation of an alternative reference frame, although other types of reference frames or other frames having predictive value can be created. In this case, the temporal filtering process can synthesize a single alternative reference frame from a filter set of frames occurring at different time periods by a process of temporal filtering of input video. The synthesized alternative reference frame can be encoded and inserted in the output bitstream. For example, having encoded frames at t−10 and t−9 (not shown in FIG. 5), the encoder logic may encode an alternative reference frame synthesized from the frames surrounding frame 66 (at time t). If the maximum filter length L is 5, then two frames on either side of reference frame 66 can be included in the filtered set (that is, frames 62, 64 and 68, 70). At each spatial pixel location, an output value is created as a weighted average of the five spatially correspondent pixel locations in frames 62-70. The filter weights for each pixel can be computed during the second pass of the encode process described below based on information gathered during the first pass of the encode process. This information can include encoding modes of the macroblocks in which the pixels reside. Alternatively, other contextual information can be used to determine the correlation between frames. The filter can be applied to every frame or can be applied to only those frames for which information (gathered during the first pass) indicates a high level of inter-frame correlation.

In the disclosed embodiments, parameters of temporal filter 40 (FIG. 2) such as filter length L, filter strength S and filter weights W, are adjusted based on the temporal correlation of the underlying signal. For example, the parameters of filter 40 can be adjusted based on the results of the first pass of encoder 20 to account for the correlation of data in the filter set 60 and in some cases motion between frames 62-70. Macroblock coding modes can be determined during the first pass and this information can be used during the second pass as an indication of temporal correlation between frames. Parameters that can be adjusted based on this information include adjustment of filter length L, filter weights W and filter strength S applied to each pixel. By adjusting these parameters, noise can thus be more effectively filtered in frames with motion between frames or other discontinuities. Filter 40 can operate on a full-frame, macro-block or any other segmentation of the frame where the degree of spatial correlation between frames can be established.

In the illustrated embodiment, the filter parameters that are adjusted are filter length L and filter weight W applied to each pixel. Filter length L can be based on the number of adjacent frames that are well correlated. In the illustrated embodiment, filter length is 5. However, a different filter length can be used, such as 11. Filter length can be effectively adjusted in the disclosed embodiment by setting filter weightings to zero as described below.

The filter weighting value or weight W applied to each pixel can be adjusted, for example, to more heavily weight those pixel values with a higher level of temporal correlation. In the illustrated embodiment, filter weight W applied to the $j^{th}$ pixel of the $i^{th}$ macroblock of the $k^{th}$ frame is as follows:

$$W_{k,i,j} = M_{k,i} \times P_{k,i,j}$$

Other suitable formulas can be used such as formulas that include a component indicative of temporal correlation between the frames. The values of $M_{k,i}$ and $P_{k,i,j}$ are referred to herein as factors in the calculation of weight $W_{k,i,j}$ but the term "factor" is used in the specification and accompanying claims synonymously with value or input, and is not limited to the mathematical definition of expressions that are multiplied together to get a product.

In the foregoing formula, the value $M_{k,i}$ is a weighting component applied to an overall macroblock within the $k^{th}$ frame. In this sense, $M_{k,i}$ is a macroblock-specific factor or value, although the value for $M_{k,i}$ can (depending on the data) be the same across a number of macroblocks. Also, the value of $M_{k,i}$ can in some embodiments be applied to any arbitrary block of pixels, and the terminology "macroblock-specific" is not limited to values of $M_{k,i}$ only for blocks that are considered "macroblocks" but rather can be applied to pixel regions of any shape and size. Generally speaking, values of $M_{k,i}$ can be determined with reference to the coding mode of the macroblock. The coding mode is an indication of the temporal correlation that the macroblock has with its spatially correspondent macroblocks in reference frame 66 or frames nearer to reference frame 66. When the macroblock is associated with intra-frame coding, it can be concluded that temporal correlation has been broken, such as might occur when there is movement in the scene. The value of $M_{k,i}$ for the macroblock can be set to zero in that case. When the macroblock is associated with 0,0 inter-frame coding, it can be concluded that a high level of temporal correlation exists. The value of $M_{k,i}$ can be set to a higher level. When the macroblock is associated with inter-frame coding and some motion vector, it can be concluded that correlation may exist, and the value of $M_{k,i}$ can be set to an intermediate level. Techniques for setting $M_{k,i}$ in the disclosed embodiment are described below.

The value $P_{k,i,j}$ is a weighting component applied to a specific pixel $p_{k,i,j}$. In this sense, $P_{k,i,j}$ is a pixel-specific factor or value. However, it should be understood that $P_{k,i,j}$ can in some embodiments be calculated for groups as pixels as well (e.g., 2-4 pixels), and so the terminology "pixel-specific" is not limited to individual pixels. Also, depending on the data, a number of pixels can have equal values of $P_{k,i,j}$.

Figure 6:
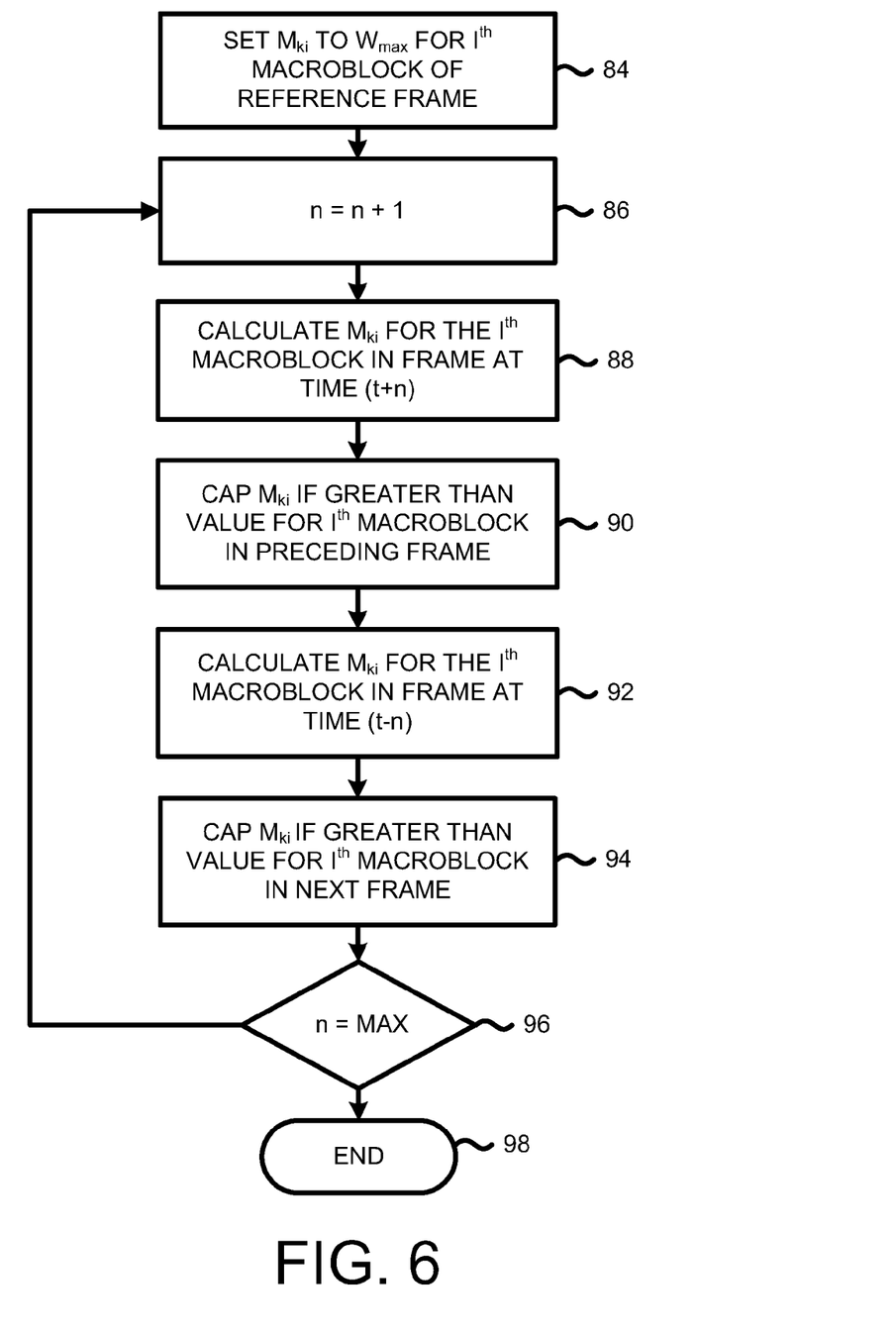
FIG. 6 is a flow chart illustrating an exemplary method of determining weightings for use by the temporal filter shown in FIG. 2.
Figure 7:
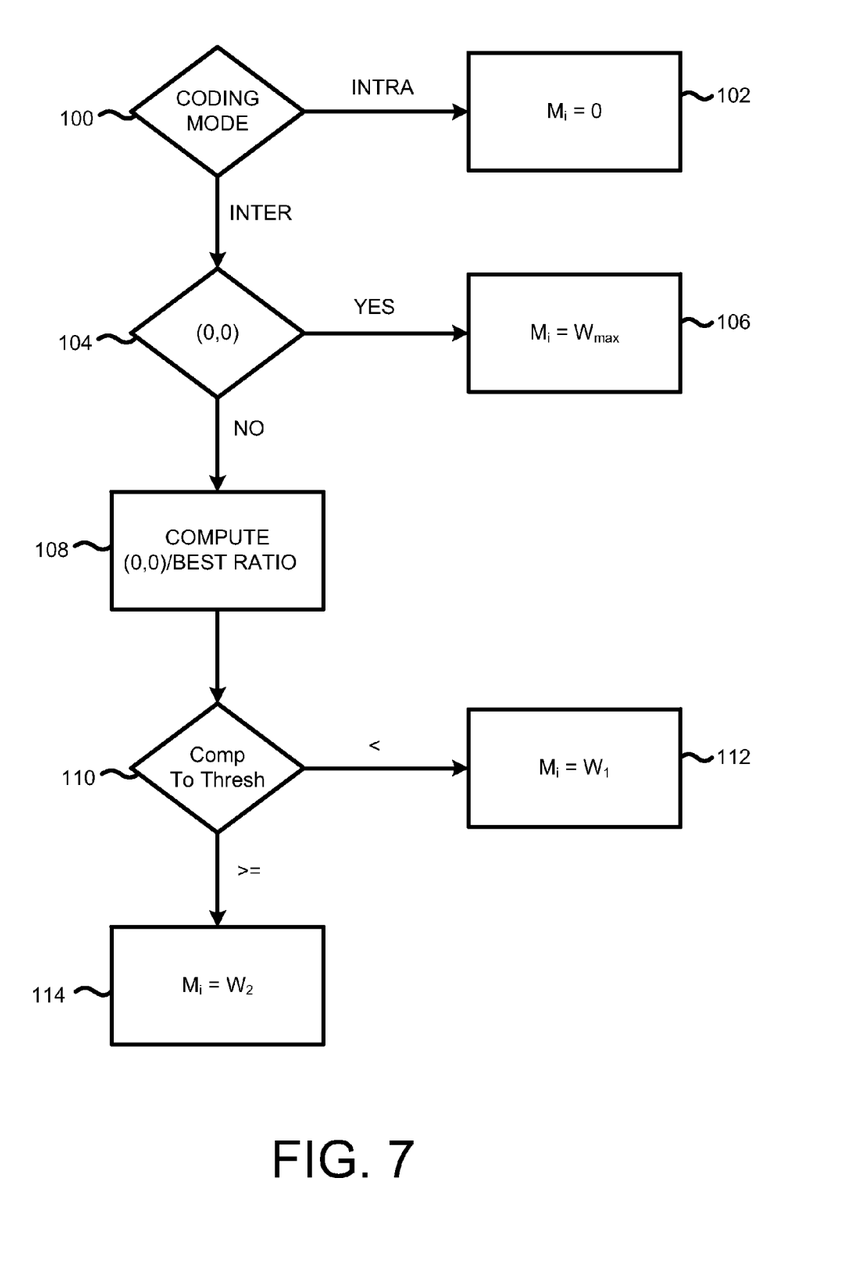
FIG. 7 is a flow chart illustrating an exemplary method of determining weightings for use by the temporal filter shown in FIG. 2.

The computation of $M_{k,i}$ is now explained with reference to FIGS. 6 and 7. Referring to FIG. 6, a logic flow chart presents one suitable technique for determining the values of $M_{k,i}$ for spatially corresponding macroblocks 72-80 in each frame of the filter set 60 (FIG. 5). FIG. 6 illustrates a capping process by which values $M_{k,i}$ of macroblocks in adjacent frames can be capped. FIG. 7 illustrates the underlying process for determining the underlying values of $M_{k,i}$ before this capping process. As explained above, the values of $M_{k,i}$ can be determined with reference to the coding mode of the subject macroblock, where the coding mode is an indication of the correlation of that block with other blocks.

With reference to FIG. 6, it is assumed for purposes of illustration that length L of filter set 60 is 5. Other filter lengths can be used. Beginning at step 84, the value of $M_{k,i}$ for the $i^{th}$ macroblock 76 of the reference frame 66 (occurring at time t) is set to a maximum weight $W_{max}$. Control then moves to step 86, where a counter n (initialized at zero) is incremented by one. Control then moves to step 88, where the weight $M_{k,i}$ is calculated for the $i^{th}$ macroblock of the $k^{th}$ frame occurring at time t+n. A specific example of the computation of $M_{k,i}$ is provided below.

Thus, in the first iteration of the process at step 88 (n=1), the value of $M_{k,i}$ would be calculated for the i$^{th}$ macroblock 78 of frame 68 occurring at time t+1 (FIG. 5). Control then moves to step 90, where a determination is made as to whether the value $M_{k,i}$ calculated at step 88 (k=t+n) is greater than the value $M_{k,i}$ calculated for the i$^{th}$ macroblock in the preceding frame (k=t+n−1). If so, at step 90 the value of $M_{k,i}$ as calculated at step 88 is capped at the value of $M_{k,i}$ for the i$^{th}$ macroblock in the preceding frame (k=t+n−1). For example, during the first iteration of step 90, the value for the $M_{(t+1),i}$ for the i$^{th}$ macroblock 78 in frame 68 occurring at time t+1 (thus, k=t+1) would be capped at the value of $M_{t,i}$ for the i$^{th}$ macroblock 76 in frame 66 occurring at time t (thus, k=t).

Control then moves to step 92, where the weight $M_{k,i}$ is calculated for the i$^{th}$ macroblock of the frame occurring at time t−n. A specific example of the computation of $M_{k,i}$ is provided below. Thus, in the first iteration of the process at step 92, the value of $M_{k,i}$ would be calculated for the i$^{th}$ macroblock 74 of frame 64 occurring at time t−1 (FIG. 5). Control then moves to step 94, where a determination is made as to whether the value $M_{k,i}$ calculated at step 92 (k=t−n) is greater than the value $M_{k,i}$ calculated for the i$^{th}$ macroblock in the following frame (k=t−n+1). If so, at step 94 the value of $M_{k,i}$ as calculated at step 92 is capped at the value of $M_{k,i}$ for the i$^{th}$ macroblock in the following frame (k=t−n+1). For example, during the first iteration of step 94, the value for the $M_{(t−1),i}$ for the i$^{th}$ macroblock 74 in frame 64 occurring at time t−1 (thus, k=t−1) would capped at the value of $M_{t,i}$ for the i$^{th}$ macroblock 76 in frame 66 occurring at time t (thus k=t). Note that if the reference frame macroblocks are always set to a maximum weighting, then the capping steps 90 and 94 can be skipped for the first iteration (that is, for the i$^{th}$ macroblocks of the frames immediately adjacent to the reference frame).

Capping the values of $M_{k,i}$ in this manner reduces the weighting for pixels following likely decreases in temporal correlation. Capping also has the effect of adjusting the effective value of length L, because when a macroblock in a frame is assigned a weight of 0, macroblocks in more remote frames (relative to the central reference frame) will be capped at 0 as well. For example, if macroblock 78 in frame 68 at time t+1 has an $M_{k,i}$ value of 0, then macroblock 80 in subsequent frame 70 (and other subsequent frames as well if length L were greater than 5) will also have a weight of 0. In effect, filter length L is reduced by 2, because the $M_{k,i}$ values for macroblocks 78 and 80 in two of the frames (68 and 70) are set to zero, meaning that the weights applies to those macroblocks 78 and 80 will be set to zero. Therefore, the pixel values in macroblocks 78 and 80 will not be included in the filter calculations. The filter length is in effect truncated starting at the first macroblock with a zero $M_{k,i}$ value.

Thus, length L can be adjusted for different macroblocks such as macroblocks 72-80 based on the prediction mode of the macrcoblocks, for example. The adjustment can also be asymmetrical, in that the length for frames occurring after the reference frame (that is, at times t+n) can be adjusted differently from the length for frames occurring before the reference frame (that is, at times t−n). For example, in the disclosed embodiment, filter length L is 5, so that reference frame 66 and two frames before (i.e., frames 62 and 64) and two frames after (i.e. frames 68 and 70) reference frame 66 are included in filter set 60. As illustrated in the preceding paragraph, a discontinuity in a frame occurring after the reference frame can have the effect of truncating the length L of the filter set going forward. However, this does not necessarily affect the size of filter set 60 with respect to frames occurring before reference frame 66.

A mechanism for achieving this result is the capping described above with respect to FIG. 6. Other suitable techniques can be used. The effect of capping is to propagate the zero weighting outward in frames more remote from the reference frame than the frame in which the discontinuity occurred. Although the example above described a situation where a macroblock was assigned a zero value of $M_{k,i}$, this capping function can have a similar effect when a macroblock is assigned an intermediate value of $M_{k,i}$, such as when the coding mode is indicative of partial correlation (i.e. interframe coding other than 0,0). This decrease in correlation might be caused for example by motion such as motion occurring in frame 68. With capping, macroblocks in frames subsequent to frame 68 (i.e. more remote from reference frame 66) have a reduced value of $M_{k,i}$ (i.e., capped at the value of $M_{k,i}$ for macroblock 78), reflecting the partial break in correlation that occurred in frame 68.

Control then moves to step 96, where the counter n is compared to the value MAX. MAX is set to L/2 if L is even and is set to (L−1)/2 if L is odd. If counter n equals MAX, then the operation terminates at step 98. Otherwise, control returns to step 86, where counter n is incremented and the process continues as described above. If an even filter length is used, the process described in FIG. 6 can be applied by filtering L/2 frames before the central reference frame and L/2−1 frames after the central reference frame. In practice any arrangement of frames around the reference frame is possible.

Note that if the central reference frame is at or near the beginning or end of a video stream, the process described in FIG. 6 can be modified to shift the filter set forward or rearward relative to the central reference frame. For example, if the central reference frame were the first frame in the video stream, the filter set can include the L frames following that reference frame.

Referring to FIG. 7, an exemplary process is illustrated for calculating the value of $M_{k,i}$ as referenced in steps 88 and 92 of FIG. 6. At step 100, a determination is made as to whether the i$^{th}$ macroblock is associated with intra-frame coding or inter-frame coding based on the information gathered during the first pass by encoder 20. The determination of whether the i$^{th}$ macroblock is associated with intra-frame coding or inter-frame coding can optionally be made differently depending on whether the i$^{th}$ macroblock resides in a frame occurring before or after the central reference frame 66. If the i$^{th}$ macroblock resides in a frame occurring after the central reference frame 66 (such as, for example, frame 68), the determination is simply based on the coding mode used for the i$^{th}$ macroblock itself. If the i$^{th}$ macroblock resides in a frame occurring before the central reference frame 66 (such as, for example, frame 64), then the determination can be based on the coding mode for the spatially correspondent i$^{th}$ macroblock in the adjacent future frame. In the discussion below with respect to the process of FIG. 7, references to the coding mode associated with the i$^{th}$ macroblock are understood to be determined thusly.

If the macroblock is associated with an intra-coding mode, then control moves to step 102, where the value of $M_{k,i}$ is set to zero. The value of $M_{k,i}$ is set to zero in this case because the fact that the i$^{th}$ macroblock is associated with intra-frame coding likely indicates a low temporal correlation with correspondent macroblocks in adjacent frames. This can be the case, for example, if the scene changes or there is some other discontinuity in the underlying video signal.

If a determination is made at step 100 that the i$^{th}$ macroblock is associated with inter-frame coding, then control moves to step 104, where a determination is made as to whether the inter-frame coding was performed using the 0,0 mode—that is, using the correspondingly spatially correspondent macroblock in a previous frame. If so, then control moves to step 106, where the value of $M_{k,i}$ is set to $W_{max}$. In this case, $W_{max}$ is a maximum value relative to the other weights assigned. The higher value is selected in some cases because the use of 0,0 mode inter-frame coding can be indicative of a high correlation of the signal between frames. Alternatively, an additional test can be applied at step 104 in which the prediction error score for the 0,0 inter-frame coding mode can be compared to a defined threshold. If the prediction error exceeds the threshold, then $M_{k,i}$ is set to 0 or some other value less than $W_{max}$ because, even though 0,0 inter-frame coding mode was used during the first pass, there is low correlation.

If a determination is made at step 104 that the inter-frame coding mode is not 0,0, then control moves to step 108. At step 108, the prediction error score is determined for the macroblock using the 0,0 inter-frame coding mode. This number is divided by the error score achieved during the first pass using the inter-frame coding mode that resulted in the lowest prediction error score (sometimes referred to herein as the "Best" predictor). The prediction error score can be determined by encoder 20 during the first pass, in which one or more encoding modes are computed and the resulting prediction error is determined. For example, an error score can be based on the sum squared error between pixel values and predicted pixel values. The mode corresponding to the lowest prediction error score can be considered to be the best predictor.

Control then moves to step 110. At step 110, the quotient (or "(0,0)/Best ratio") resulting from the dividing operation of step 108 is compared to a threshold value. The threshold value can be determined empirically depending on specific implementations but in this case is set to 1.1. If the quotient is below the threshold, then control moves to step 112, and the value of $M_{k,i}$ is set to a mid-range value $W_1$. If the quotient is at or above the threshold, then control moves to block 114, where the value of $M_{k,i}$ is set to a lower value $W_2$. The values $W_{max} \geq W_1 \geq W_2 \geq 0$ can be determined empirically and can vary depending upon the specific implementation of the encoder. In the disclosed embodiment, $W_{max}=2$, $W_1=1$ and $W_2=0$. The mid-range value $W_1$ and lower value $W_2$ are selected in some cases because an intercoded macroblock with a small motion vector may still have a correlation with the correspondingly spatially disposed macroblock in another frame if the computed (0,0)/Best ratio is close to 1. In place of discrete values, $W_{max} \geq W_1 \geq W_2 \geq 0$, ranges can be used. In some cases, the ranges do not completely overlap. For example, $W_1$ could be a value taken from range such as 2 through 3 and $W_2$ can be a value taken from a range such as 1 through 2.

It will be appreciated that the process described in FIG. 7 has the result of determining whether the temporal correlation associated with the macroblock under consideration falls below a threshold, and this test can be applied differently depending on how the macroblock is coded. For example, if the macroblock is intra-frame encoded, the determination is always made that the temporal correlation falls below the threshold. If the macroblock is inter-frame encoded, then (as explained above), computations are performed to determine if the temporal correlation falls below a threshold. In the example above, these calculations use prediction error scores, but other suitable techniques can be employed.

The computation of $P_{k,i,j}$ is now explained. The value of $P_{k,i,j}$ is a weight computed separately for each $i^{th}$ pixel within the $i^{th}$ macroblock in each frame k. Pixels can be indexed in the macroblock in any order, but solely for purposes of illustration it is assumed that as j increases from 0, pixels in the macroblock are traversed in raster order. For example, filter set 60 includes frame 62 occurring at time t−2 (thus, k=t−2), which has an $i^{th}$ macroblock 72. Within the $i^{th}$ macroblock 72 is a pixel, $p_{k,i,j}$ where the subscript k designates the frame (in this case frame 62 occurring at time t−2) and the subscript j indicates the position of the pixel within the $i^{th}$ macroblock 72. Each of the other frames 64-70 includes $i^{th}$ macroblocks (namely, macroblocks 74-80) that are spatially correspondent with macroblock 72 of frame 62. Likewise, each of the spatially correspondent macroblocks 74-80 include pixels that are spatially correspondent to pixel $p_{k,i,j}$ of macroblock 72. For example, reference frame 66 includes a pixel $p_{t,i,j}$ (k=t) and frame 70 includes a pixel $p_{k,i,j}$ (k=t+2) that are both spatially correspondent to the pixel $p_{k,i,j}$ of macroblock 72.

A weight $P_{k,i,j}$ is computed for each pixel in the frame based on the difference between its value and the value of the spatially corresponding pixel in the central reference frame 76, which is designated as pixel $p_{t,i,j}$ in FIG. 5. One suitable formula for determining the $P_{k,i,j}$ value is as follows:

$$P_{k,i,j} = a - CAP(b*(p_{k,i,j} - p_{t,i,j})^2/n^S),$$

where a and b are empirically derived constants (in this case, a=16 and b=3), n is an integer (in this case 2), S equals filter strength and the function CAP clips the value within parentheses to a maximum value of a. In the foregoing formula, the $j^{th}$ pixel in reference frame 66 (occurring at time t) is $p_{t,i,j}$, and the pixels at the corresponding spatial position in the other frames from filter set 60 are $p_{k,i,j}$, with k=(t−2, t−1, t+1, t+2). Thus, weight $P_{k,i,j}$ is a measure of the temporal correlation between values of spatially correspondent pixel values in reference frame 66 and earlier or later frames 62-64 and 68-70, respectively. Note that the constants used in this formula can vary depending on the implementation in which this embodiment is practiced.

Filter strength S in this case is set between 0 and 6, but other suitable values can be empirically determined for specific implementations. Larger values of S produce stronger filtering as they produce non-zero weights for pixel pairs having greater differences. Alternative formulas can be used. For example, formulas can be used that include a characteristic to weigh more heavily those pixels having a relatively small difference from the spatially correspondent pixel values in the reference frame 66 occurring at time t. The value of filter strength S is selected empirically depending on specific implementations of the disclosed embodiment. A higher value of S can be helpful when processing a noisier signal.

When the values of $W_{k,i,j}$ are computed for each pixel, the filtered output value of the $j^{th}$ pixel of the $i^{th}$ macroblock of the constructed frame is computed as follows:

$$\text{Filter output}_{k,i,j} = \Sigma(W_{k,i,j} * p_{k,i,j}) / \Sigma(W_{k,i,j})$$

In this case, the filter output for the pixel $p_{i,j}$ of the constructed reference frame would be the weighted average of spatially corresponding pixel values in each of frames 62-70, with the weight $W_{k,i,j}$ of each pixel in each frame determined as described above. This weighted average can be computed for each spatially corresponding group of pixels in filter set 60. The value of the filter output can be used to set the pixel value in a constructed or alternative reference frame or other predictor that can be displayed or not displayed to the user. The summation of the foregoing formula is taken over the index k.

In the disclosed embodiment, frames 62-70 can be partitioned into macroblocks 72-80, because coding mode information for macroblocks is available from the first pass encode at this level. Alternatively, other spatial partitions can be used and the partitions can also be defined at the pixel level. Accordingly, the terms "macroblock" and "block" as used in the claims refer to any block of pixels of any arbitrary size including macroblocks. Improved results can be obtained if the degree of correlation between frames can be established for such alternative partitions.

For example, for the $i^{th}$ macroblock the encoder 20 can search frame 62 (time t–2) for a block of pixels (e.g., the motion compensated block 116 shown in FIG. 5) that best matches the spatially correspondent $i^{th}$ macroblock in frame 66 at time t. The center of the motion compensation search area is the same spatial location as the $i^{th}$ macroblock, and in the disclosed embodiment a search radius of three pixels is used. A larger or smaller search radius may be employed depending on the specific implementation.

The preceding technique can include optional features. For example, motion compensation can be used selectively where either the $i^{th}$ macroblock was encoded in a preceding pass with an intra mode, an inter mode with a non zero motion vector or 0,0 inter-frame coding where the correlation is below a predetermined threshold In an alternative embodiment, filter 40 can operate on two fields of an interlaced video sequence independently, given the potential for spatial incoherence within each frame in the presence of motion.

In an alternative embodiment, filter set 60 can be selected from frames that are either all preceding or all following the reference frame. In other words, the filter set can be a set other than one temporally centered about the reference frame.

In an alternative embodiment, temporal filter 40 can be implemented in a single-pass encoder as well. In that case, a number of input frames can be buffered in encoder 20 before it produces the first compressed frame. The information collected during the first pass of a two-pass encode process (e.g., encoding modes of macroblocks) can be calculated over the set of buffered frames rather than the entire clip as it is in the two-pass encoder.

The embodiment as disclosed herein for creating temporally filtered reference frames can be used with codecs such as VP8 that support "constructed" reference frames. In an alternative embodiment, the disclosed filter can be used as a temporal noise-reduction pre-filter stage feeding an encoder employing an arbitrary compression method, including for example H.264.

The above-described embodiments have been described in order to allow easy understanding of the present invention and do not limit the present invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A method for decoding an encoded bitstream to generate a video signal having a plurality of frames, comprising:
   receiving the encoded bitstream at a decoder, the encoded bitstream including the plurality of frames and a reference frame;
   decoding a portion of the encoded bitstream to obtain at least a portion of the reference frame using a decoder, the at least a portion of the reference frame generated by a process of:
      determining a plurality of factors for a first block residing in a selected frame and spatially correspondent to a portion of a reference frame, wherein each of the plurality of factors is at least partially derived from a correlation between the first block and at least a second block residing in a different one of the plurality of frames; and
      applying a filter using filter weights formulated from the plurality of factors to the portion of the reference frame to generate the at least the portion of the reference frame;
   generating a residual from another portion of the encoded bitstream, the residual representing a portion of a frame of the plurality of frames; and
   reconstructing the portion of the frame by adding the residual to the at least the portion of the reference frame; wherein the selected frame and the different one of the plurality of frames form a portion of a filter set of frames and the plurality of factors comprises:
   a block-specific factor of the first block, the block-specific factor derived from a prediction coding mode associated with at least some blocks in the filter set, including the first block, and wherein determining the block-specific factor during the process comprises:
   determining a first prediction error score for the first block relative to the second block;
   determining a second prediction error score that is the best prediction error score for the first block relative to a block of pixels other than the second block; and
   determining the block-specific factor using a ratio of the first prediction error score to the second error prediction score.

2. The method of claim 1 wherein the first and second blocks are spatially correspondent.

3. The method of claim 1 wherein the first block includes a plurality of pixels, and the plurality of factors further comprises:
   for each of a plurality of pixels within the first block, a pixel-specific factor derived from the correlation that such pixel bears to a spatially correspondent pixel in a frame other than the selected frame; and wherein the filter weights for each of a plurality of pixels within the portion of the reference frame were formulated from the pixel-specific factor and the block-specific factor of the first block.

4. The method of claim 1 wherein the block-specific factor comprises:
   a value within a first range when the prediction coding mode is inter-frame coding without a motion vector;
   a value within a second range when prediction coding mode is inter-frame coding with a motion vector; and
   a value within a third range when prediction coding mode is the intra-frame coding;
   wherein the first range, second range and third range do not completely overlap with each other.

5. An apparatus for decoding an encoded bitstream to generate a video signal having a plurality of frames, comprising:
   a decoder configured to:
      receive the encoded bitstream;
      decode a portion of the encoded bitstream to obtain at least a portion of a predictive reference frame using the decoder, the at least a portion of the predictive reference frame generated by a process of:
         determining a plurality of factors for a first block residing in a selected frame and spatially correspondent to a portion of a reference frame, wherein each of the plurality of factors is at least partially derived from a correlation between the first block and at least a second block residing in a different one of the plurality of frames; and applying a filter using filter weights formulated from the plurality of factors to the portion of the reference frame to generate the at least the portion of the predictive reference frame;

generate a residual from another portion of the encoded bitstream, the residual representing a portion of a frame of the plurality of frames; and reconstruct the portion of the frame by adding the residual to the at least the portion of the predictive reference frame; and a display for displaying the video signal; wherein the plurality of factors includes:

a block-specific factor for the first block, the block-specific factor derived from a prediction coding mode for the first block, the prediction coding mode being one of inter-frame coding without motion compensation, inter-frame coding with motion compensation or intra-frame coding; and wherein the block-specific factor comprises:

a value within a first range when the prediction coding mode is the inter-frame coding without motion compensation;

a value within a second range when prediction coding mode is the inter-frame coding with motion compensation; and a value within a third range when prediction coding mode is the intra-frame coding;

wherein the first range, second range and third range do not completely overlap with each other.

6. The apparatus of claim 5 wherein the correlation is a temporal correlation, the selected frame and the different one of the plurality of frames form a portion of a filter set, and a size of the filter set is based upon the temporal correlation.

7. The apparatus of claim 5 wherein the decoder is configured to:

generate a second residual from another portion of the encoded bitstream, the second residual representing a portion of a second frame of the plurality of frames; and reconstruct the portion of the second frame by adding the second residual to the at least the portion of the predictive reference frame.

8. The apparatus of claim 5 wherein the portion of the encoded bitstream includes header information.

9. The apparatus of claim 5 wherein determining the block-specific factor during the process comprises:

determining a first prediction error score for the first block relative to the second block;

determining a second prediction error score that is the best prediction error score for the first block relative to a block of pixels other than the second block; and determining the block-specific factor using a ratio of the first prediction error score to the second error prediction score.

10. A method for decoding an encoded bitstream to generate a video signal having a plurality of frames, comprising:

receiving the encoded bitstream at a decoder;

decoding a portion of the encoded bitstream to obtain at least a portion of a predictive reference frame using the decoder, the at least a portion of the predictive reference frame generated by a process of:

determining a plurality of factors for a first block residing in a selected frame, wherein each of the plurality of factors is at least partially indicative of a correlation between the first block and at least a second block residing in a different one of the plurality of frames, wherein the plurality of factors comprises a prediction coding mode associated with the first block and a block-specific factor of the first block, the block-specific factor derived from the prediction coding mode and comprising a value within a first range when the prediction coding mode is inter-frame coding without a motion vector, a value within a second range when prediction coding mode is inter-frame coding with a motion vector, and a value within a third range when prediction coding mode is intra-frame coding, and wherein the first range, second range and third range do not completely overlap with each other; and applying filter weights derived from the plurality of factors to at least the first block and the second block to generate the at least the portion of the predictive reference frame;

generating a residual from another portion of the encoded bitstream, the residual representing a portion of a frame of the plurality of frames; and reconstructing the portion of the frame by adding the residual to the at least the portion of the predictive reference frame.

11. The method of claim 10 wherein the first block includes a plurality of pixels, and the plurality of factors further comprises:

for each of a plurality of pixels within the first block, a pixel-specific factor derived from the correlation that such pixel bears to a spatially correspondent pixel in a frame other than the selected frame; and wherein the filter weights for each of the plurality of pixels within the first block were derived from the pixel-specific factor and the block-specific factor of the first block.

12. The method of claim 10 wherein determining the block-specific factor during the process comprises:

determining a first prediction error score for the first block relative to the second block;

determining a second prediction error score that is the best prediction error score for the first block relative to a block of pixels other than the second block; and determining the block-specific factor using a ratio of the first prediction error score to the second error prediction score.

* * * * *